US010469289B2

(12) United States Patent
Chakravarty et al.

(10) Patent No.: US 10,469,289 B2
(45) Date of Patent: Nov. 5, 2019

(54) INFRASTRUCTURE FUNCTIONS ENABLED MOBILE NETWORK

(71) Applicant: GREENSTAR RESEARCH AND DEVELOPMENT INDIA PRIVATE, Haryana (IN)

(72) Inventors: Jyotirmoy Chakravarty, Boerne, TX (US); Sarosij Sengupta, Haryana (IN); Lalit Kumar, New Delhi (IN)

(73) Assignee: GREENSTAR RESEARCH AND DEVELOPMENT (IN)

( * ) Notice: Subject to any disclaimer, the term of this patent is extended or adjusted under 35 U.S.C. 154(b) by 0 days.

(21) Appl. No.: 15/559,104

(22) PCT Filed: Mar. 16, 2016

(86) PCT No.: PCT/IB2016/000302
§ 371 (c)(1),
(2) Date: Sep. 18, 2017

(87) PCT Pub. No.: WO2016/147044
PCT Pub. Date: Sep. 22, 2016

(65) Prior Publication Data
US 2018/0054328 A1 Feb. 22, 2018

(30) Foreign Application Priority Data

Mar. 16, 2015 (IN) .............................. 702/DEL/2015

(51) Int. Cl.
*H04L 12/66* (2006.01)
*G01N 33/00* (2006.01)
*G06K 9/00* (2006.01)
*H04W 48/12* (2009.01)
*H04L 12/701* (2013.01)
*H04W 4/70* (2018.01)
(Continued)

(52) U.S. Cl.
CPC ........ *H04L 12/66* (2013.01); *G08B 13/19656* (2013.01); *H04L 67/125* (2013.01); *H04W 4/70* (2018.02); *H04W 88/10* (2013.01); *H04L 67/12* (2013.01); *H04W 4/42* (2018.02); *H04W 88/08* (2013.01)

(58) Field of Classification Search
CPC ....... H04L 12/66; H04L 67/125; H04L 67/12; H04W 88/10; H04W 4/046; H04W 4/70; H04W 88/08; G08B 13/19656
See application file for complete search history.

(56) References Cited

U.S. PATENT DOCUMENTS 6,952,421 B1* 10/2005 Slater ..................... H04L 45/00
370/401
2008/0045156 A1* 2/2008 Sakhpara ........... G01N 33/0063
455/67.11
(Continued)

*Primary Examiner* — Kiet Tang
(74) *Attorney, Agent, or Firm* — Hill Wallack LLP; Jason L. DeFrancesco

(57) ABSTRACT

A mobile base station and a cellular mobile base station network which provides integrated infrastructure facilities in the vicinity of each cellular base station. The Cellular Base Station comprises a cellular base transceiver station (Node-B) and an integrated infrastructure facility device operatively coupled to said cellular base transceiver (Node-B) for utilizing the cellular network to communicate with the remote monitoring stations for each of the infrastructure facilities provided by said device.

8 Claims, 3 Drawing Sheets

101 = Cellular Base Station
102 = Video Surveillance Unit
103 = Public Transport Vehicle Tracking Unit
104 = Air Pollution Monitoring Unit

(51) Int. Cl.
  *G08B 13/196*   (2006.01)
  *H04L 29/08*    (2006.01)
  *H04W 88/10*    (2009.01)
  *H04W 4/42*     (2018.01)
  *H04W 88/08*    (2009.01)

(56) References Cited

U.S. PATENT DOCUMENTS

| | | | | |
|---|---|---|---|---|
| 2012/0063641 | A1* | 3/2012 | Venkatesh | G06K 9/00771 |
| | | | | 382/103 |
| 2013/0217381 | A1* | 8/2013 | Dhanda | H04W 48/12 |
| | | | | 455/422.1 |
| 2013/0281111 | A1* | 10/2013 | Syrjarinne | G01S 5/0252 |
| | | | | 455/456.1 |
| 2015/0156718 | A1* | 6/2015 | Skaaksrud | H04W 12/06 |
| | | | | 370/311 |
| 2016/0063503 | A1* | 3/2016 | Kobres | G06F 21/316 |
| | | | | 705/18 |

* cited by examiner

101 = Cellular Base Station
102 = Video Surveillance Unit
103 = Public Transport Vehicle Tracking Unit
104 = Air Pollution Monitoring Unit 101 = Pole
201 = Integrated Infrastructure Facilities Device

INFRASTRUCTURE FUNCTIONS ENABLED MOBILE NETWORK

The present invention relates to an enhancement to existing mobile network resources to provide a multitude of important infrastructure services in addition to its mobile communication function. The enhanced mobile network comprises a plurality of "enhanced" Base Station units that are equipped to provide a multitude of other infrastructure services.

BACKGROUND

Several modern day infrastructural facilities require delivery of services across a large geographic area covering a town, city or district. Well known examples of such facilities include lighting infrastructure (including lighting of roads and streets), traffic management, and public transport. New requirements are also emerging such as those relating to women's security and general street crime, and air-pollution monitoring. Such facilities are termed "infrastructure facilities". As the need for such facilities has gained importance various solutions have emerged, however all such suggestions provide stand-alone solutions addressing only a single infrastructure facility. As a consequence, modern day implementations reveal several solutions that coexist separately in proximity with one another.

FIG. 1 shows an existing arrangement of providing infrastructure facilities, for example in a smart city. The mobile communication infrastructure (101) exists separately and independently from the remaining infrastructure facilities such as Video Surveillance (102), Public Transport Vehicle Monitoring (103) and Air Pollution monitoring (104). Common resources are not shared and each facility operates independently and non-synergistically. As a result, advantages that could accrue from interaction are not realized thereby limiting efficacy and lacking efficiency and cost effectiveness.

Infrastructure facilities are driven by the need for communication between field units and central control and monitoring stations that are responsible for the maintenance and upkeep of such facilities across a large geographic area. This common requirement is inherent to every one of the infrastructure facilities and comprises a significant portion of the functional behavior of such facilities. Practical limitations and cost constraints very often necessitate the use of wireless communication for meeting this requirement. Individual field units are therefore equipped with wireless communication capabilities. In the vast majority of cases the wireless communication is in the form of radio communication.

Field units of several of the infrastructure facilities are often situated in proximity to one another. In particular, roads and street poles are convenient and logical locations for the deployment of such devices. As a result, several of the field units from different infrastructure facilities are clustered together in such areas. The wireless radio signals from different systems overlap and are prone to interfere with one another. This situation is aggravated by the fact that the radio spectrum is already crowded and it is difficult to allocate the communication frequencies in a segregated manner.

OBJECTS AND SUMMARY

It is an object of this invention to overcome the above-mentioned problems.

Another object of the present invention is to improve the cost effectiveness of implementing infrastructure facilities.

Yet another object of the present invention is to improve the security and reliability of implementation of infrastructure system implementation.

To achieve the stated objects, the present invention provides a cellular base station that comprises an integrated infrastructure facility device operatively coupled to the cellular base transceiver station for utilizing the cellular network to communicate with the remote monitoring stations for each of the infrastructure facilities provided by the device.

In one preferred embodiment, the integrated infrastructure facility device comprises video surveillance and air-pollution monitoring infrastructure facilities.

In another preferred embodiment, the integrated infrastructure device includes public transport surveillance infrastructure facility.

In yet another embodiment, the integrated infrastructure device includes traffic monitoring infrastructure facility.

BRIEF DESCRIPTION OF DRAWINGS

The invention will now be explained with reference to the accompanying drawings in which like characters represent like parts throughout.

DETAILED DESCRIPTION

The following paragraphs describe preferred embodiments of the device according to the invention. It will be obvious to a person of ordinary skill in the art will be aware that the activities described are only exemplary and several variations are possible, all of which are understood to fall within the scope of this disclosure. Various subsets of activities described as well as obvious extensions of functions would be similarly covered by this disclosure.

Figure 1:
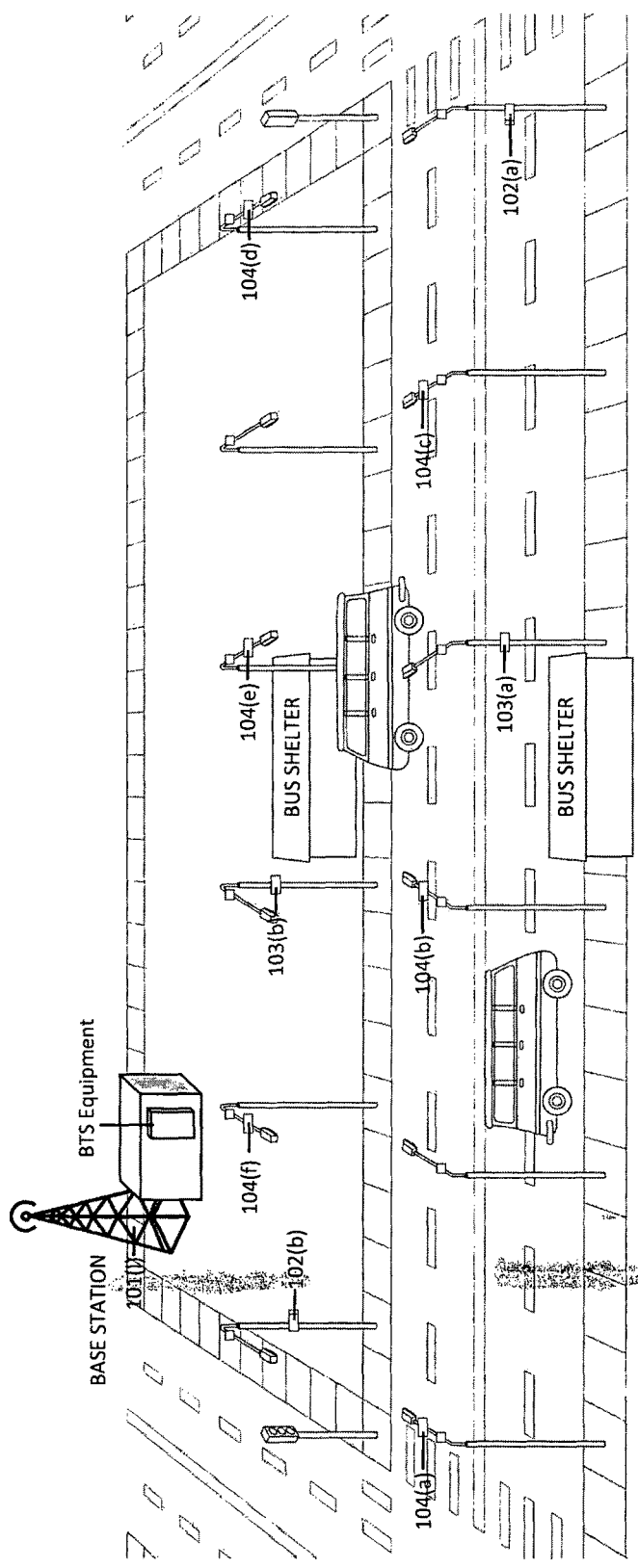
FIG. 1 shows the prior art as visible in a typical street of a modern "smart city".
Figure 2:
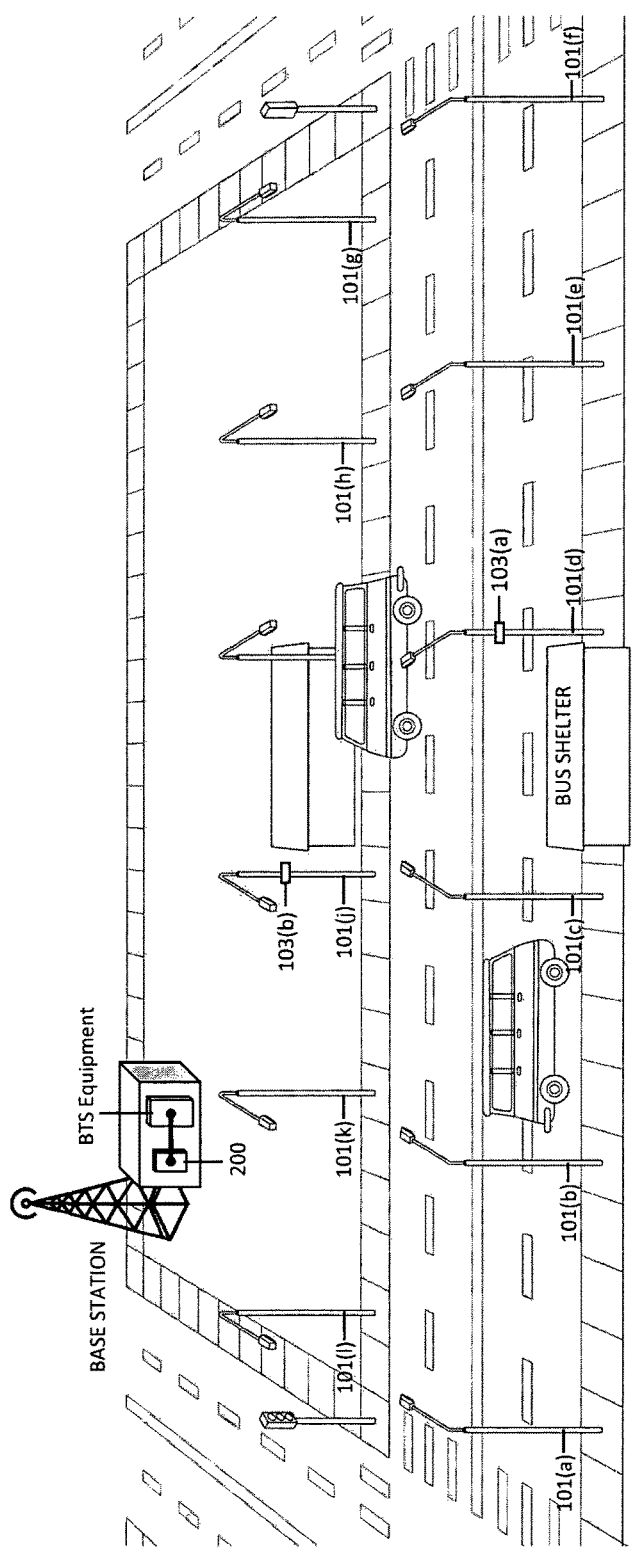
FIG. 2 shows the basic structure of a modified Cellular Base station and infrastructure facilities implementation according to the present invention.

In particular, as shown in FIG. 2, the invention builds on existing mobile communications infrastructure to provide a multitude of supplementary functions at minimal additional cost. An Integrated Infrastructure Facilities Implementation device (200) is coupled to the Base Transceiver station equipment inside the Cellular Base Station. The Integrated Infrastructure Facilities Implementation device (200) incorporates all the functions and capabilities of the individual infrastructure systems of the prior art.

Figure 3:
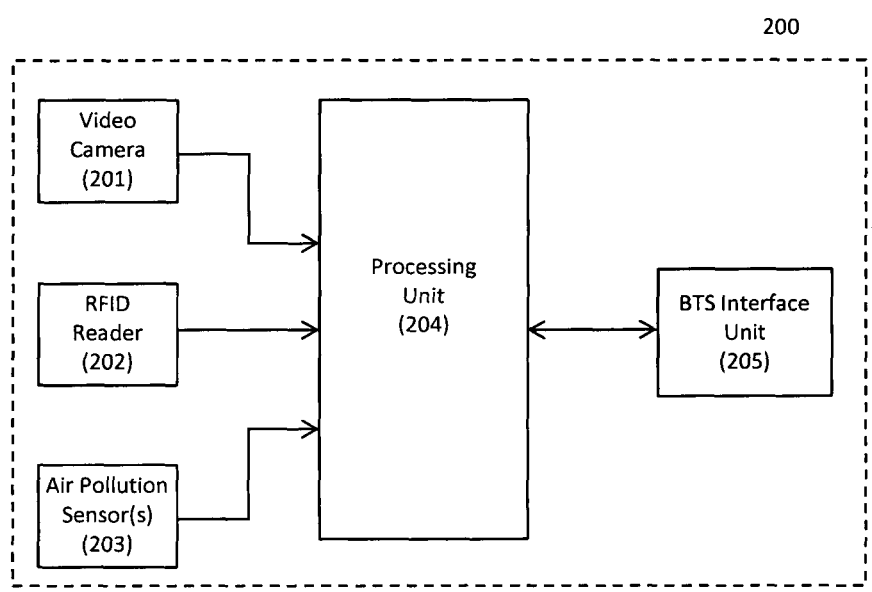
FIG. 3 shows one preferred embodiment of an integrated infrastructure facilities device as used inside the Cellular Base Station, according to the present invention.

FIG. 3 shows the block diagram of one preferred embodiment of the Integrated Infrastructure Facilities Implementation device (200). Individual sensing devices Video Camera (201) for providing Video Surveillance, RFID Reader concentrator (202) for field deployed RFID Reader units 103(a) and 103(b), and Air Pollution sensor (203) are coupled to Processing Unit (204) which implements those infrastructure facility functions either independently or with the assistance of one or more remote processing and/or storage units using BTS Interface Unit (205) which enables the use of the BTS in the Cellular Base Station for communication.

At the same time information is relayed to one or more remotely located Central Monitoring Stations in real-time using the same Cellular link.

The solution can be implemented on all mobile base stations without limitation. By leveraging the large physical presence and reach of the existing mobile base station network, this approach provides for quick and easy deployment of all the advantageous functions and features across the entire city/district/town and even in the inter-city spaces. The additional infrastructure functions can extend to wider areas and locations at minimal cost and with great convenience by "riding" on the ongoing mobile communication expansion.

The Integrated Infrastructure Facilities Implementation device (200) possesses powerful processing capacity and is highly scalable. It is therefore capable of implementing many functions simultaneously and can support additional features to fulfill future requirements.

In preferred embodiments multiple communication links and modes are implemented in each Integrated Infrastructure Facilities Implementation device (200) so as to provide redundancy and implement fault-tolerance.

The communication links also enable each Integrated Infrastructure Facilities Implementation device (200) to monitor the status of neighboring Integrated Infrastructure Facilities Implementation device (200) and report any malfunction, thereby enhancing the reliability of the entire intelligent network.

Each Integrated Infrastructure Facilities Implementation device (200) is designed to be scalable in terms of features and capacity throughout its operating life with the ability of adding several functions during regular operation, by remote upgrades of its functional capabilities. Such capability enhancements are automatically detected and announced by the upgraded unit and transmitted to the designated monitoring station(s). Similarly, the addition of any new. Integrated Infrastructure Facilities Implementation device (200) (for example, by field up-gradation/replacement) will automatically be registered by the entire network and reported at the designated monitoring station(s) along-with its capabilities and features.

Individual Integrated Infrastructure Facilities Implementation device (200) implements continuous or periodic/ externally-triggered self-health checks including status checks on input power supply, and report the results of the checks to the central monitoring station(s) at regular intervals/during normal communication sessions as well special transmissions on the occurrence of specific events including, but not limited to, events such as input power failure which is reported during the brief "hold-up" period of the internal power supply. On resumption of power, the Integrated Infrastructure Facilities Implementation device (200) is able to automatically re-configure itself to its status prior to the outage and re-register itself on the network and then report its status to the designated monitoring station(s).

Each Integrated Infrastructure Facilities Implementation device (200) preferably incorporates special features to enhance the reliability of the data transfer to/from the designated monitoring station(s). The data integrity includes mechanisms for checking and validating the identity of the source and destination of the data transfer, as well as the type and value of the individual data elements. Wherever possible, error-correction mechanisms are also incorporated for recovering original information from corrupted data received at the destination points.

In one embodiment, the Integrated Infrastructure Facilities Implementation device (200) also includes the capability to securely encrypt data originating from it as well as decrypt data for which it is the destination, in order to provide secure data transfer through the network. As a further security measure, the Integrated Infrastructure Facilities Implementation device (200) may include authentication mechanisms that verify the source of data received by it as destination. Such measures may include "challenge-response" mechanisms.

In one preferred embodiment, a Integrated Infrastructure Facilities Implementation device (200) includes GPS functionality to self-determine its location and include this feature in its reports.

Optional features include the ability of a Integrated Infrastructure Facilities Implementation device (200) to recognize and report on external threats to its integrity. This ability is enabled by incorporation of unauthorized proximity sensors and access-authentication mechanisms in the unit.

Several embodiments are possible for the power source for the Integrated. Infrastructure Facilities Implementation device (200) including autonomous power units, as well as common power sources that powers the host mobile communication base station.

We claim:

1. A cellular base station, comprising:
   a cellular base transceiver station (Node-B); and
   an integrated infrastructure facility device operatively coupled to said cellular base transceiver station (Node-B), said integrated infrastructure facility device being located inside said cellular base station, for utilizing a cellular network to communicate with remote monitoring stations for each of infrastructure facilities provided by said integrated infrastructure facility device;
   wherein said integrated infrastructure facility device comprises video surveillance and air-pollution monitoring infrastructure facilities, said video surveillance being provided through a video camera and said air-pollution monitoring being provided through an air pollution sensor; and
   wherein said integrated infrastructure facility device includes a public transport surveillance infrastructure facility.

2. The cellular base station as claimed in claim 1, wherein said public transport surveillance infrastructure facility includes field-deployed Radio Frequency Identification (RFID) Reader units.

3. The cellular base station as claimed in claim 1, wherein said integrated infrastructure facility device is further configured to relay information to one or more remotely located Central Monitoring Stations, in real-time, using said cellular network.

4. The cellular base station as claimed in claim 3, wherein said information includes capability enhancements, an addition to said cellular network, a periodic status checks report, a location and an occurrence of a specific event.

5. The cellular base station as claimed in claim 1, wherein said integrated infrastructure facility device is further configured to monitor status of a neighboring integrated infrastructure facility device located inside another cellular base station.

6. The cellular base station as claimed in claim 1, wherein said integrated infrastructure facility device is further configured to securely encrypt and decrypt data being transferred to and being received from said cellular network, respectively.

7. The cellular base station as claimed in claim 1, wherein said integrated infrastructure facility device further includes a Global Positioning System (GPS) functionality to self-determine a location of said integrated infrastructure facility device.

8. The cellular base station as claimed in claim 1, wherein said integrated infrastructure facility device further includes proximity sensors and access authentication mechanisms.

* * * * *